(12) United States Patent
Van Der Endt et al.

(10) Patent No.: US 12,540,730 B2
(45) Date of Patent: Feb. 3, 2026

(54) METHOD FOR PYROLYSIS OF WASTE MATERIAL IN THE PRESENCE OF AN AUXILIARY MATERIAL

(71) Applicant: CCT INTERNATIONAL, Antwerpen-Berchem (BE)

(72) Inventors: Johannes Dingenis Van Der Endt, Antwerp (BE); Rik Van Meirhaeghe, Gavere (BE)

(73) Assignee: CCT INTERNATIONAL, Antwerpen-Berchem (BE)

( * ) Notice: Subject to any disclaimer, the term of this patent is extended or adjusted under 35 U.S.C. 154(b) by 373 days.

(21) Appl. No.: 17/924,810

(22) PCT Filed: Apr. 27, 2021

(86) PCT No.: PCT/EP2021/060972
§ 371 (c)(1),
(2) Date: Nov. 11, 2022

(87) PCT Pub. No.: WO2021/228547
PCT Pub. Date: Nov. 18, 2021

(65) Prior Publication Data
US 2023/0201894 A1      Jun. 29, 2023

(30) Foreign Application Priority Data
May 14, 2020   (BE) .................................. 2020/5337

(51) Int. Cl.
*F23G 5/027*    (2006.01)
*B09B 3/38*     (2022.01)
(Continued)

(52) U.S. Cl.
CPC ................ *F23G 5/027* (2013.01); *B09B 3/38* (2022.01); *B09B 3/40* (2022.01); *B09B 2101/77* (2022.01)

(58) Field of Classification Search
CPC ......... B09B 3/38; B09B 3/40; B09B 2101/70; B09B 2101/75; B09B 2101/77;
(Continued)

(56) References Cited

U.S. PATENT DOCUMENTS 5,608,136 A * 3/1997 Maezawa ................. C10G 1/10
                                                                  588/317
2010/0147670 A1 * 6/2010 Schmidt .................. C10B 47/28
                                                                  201/12

FOREIGN PATENT DOCUMENTS

DE    102007024706 A1    12/2008
JP         S5876128 A     5/1983
(Continued)

OTHER PUBLICATIONS

International Search Report from PCT Application No. PCT/EP2021/060972, Aug. 20, 2021.
(Continued)

*Primary Examiner* — In Suk C Bullock
*Assistant Examiner* — Jason Y Chong
(74) *Attorney, Agent, or Firm* — Workman Nydegger

(57) ABSTRACT

A method for thermally decomposing a carbonaceous waste material including: filling a reactor defined by a reactor wall with the waste material and an auxiliary material, resulting in a reactor content, the auxiliary material including abrasive particles; heating the reactor contents in the absence of oxygen, such that gaseous products are formed by pyrolysis of the waste material and the abrasive particles do not melt or thermally decompose; moving the reactor contents during the pyrolysis, the moving being adapted to mix the reactor contents and to cause the abrasive particles to scrape over at least parts of the reactor wall. The auxiliary material has a composition to include a component adapted to bind halogens present in the gaseous products and/or so that the (Continued)

brittleness of the auxiliary material is greater than the brittleness of the reactor wall.

13 Claims, 2 Drawing Sheets

(51) Int. Cl.
*B09B 3/40* (2022.01)
*C10G 1/10* (2006.01)
*B09B 101/77* (2022.01)

(58) Field of Classification Search
CPC ... B09B 2101/80; B09B 2101/85; B09B 5/00; Y02P 20/143; C10B 7/02; C10B 47/18; C10B 53/00; C10B 53/07; C10B 57/06; C10G 1/10

See application file for complete search history.

(56) References Cited

FOREIGN PATENT DOCUMENTS

| JP | H11235561 A | 8/1999 |
| JP | 2004323620 A | 11/2004 |
| WO | 0053385 A1 | 9/2000 |

OTHER PUBLICATIONS

Search Report from corresponding Belgian Application No. BE 202005337, Jan. 29, 2021.

Adhikari et al., "Reclamation and Recycling of Waste Rubber," Progress in Polymer Science, vol. 25, No. 7, Sep. 1, 2000, pp. 909-948.

Communication pursuant to Article 94(3) EPC from Corresponding European Patent Application No. EP21720308.2, Nov. 19, 2024.

* cited by examiner

METHOD FOR PYROLYSIS OF WASTE MATERIAL IN THE PRESENCE OF AN AUXILIARY MATERIAL

TECHNICAL AREA

The present invention relates generally to the pyrolysis of waste material, e.g., plastic waste. In particular, the invention provides a solution for a pyrolysis process that makes it possible to obtain end products of the desired composition in a simplified manner, with a high yield and minimal presence of pollutants.

BACKGROUND OF THE INVENTION

The use of plastic is ubiquitous today, resulting in huge amounts of plastic waste. The fact that plastic is not biodegradable necessitates the search for solutions that can recycle plastic waste into reusable products. Pyrolysis or thermal cracking of plastic waste material is an attractive solution for this. Pyrolysis involves heating the waste material to a high temperature, typically around 410 to 440° C., in the absence of oxygen to avoid oxidation or ignition of the material. This involves thermal degradation, whereby bonds present in the plastic polymers are broken, resulting in hydrocarbons with a smaller molecular weight than the original polymers. During the pyrolysis, a volatile fraction is formed on the one hand and a fraction of charred products on the other. The volatile fraction comprises hydrocarbon chains of various lengths, which are all gaseous at the high pyrolysis temperature. The charred fraction includes carbonized products, which, for example, remain as ashes. Part of the volatile fraction, namely the long-chain hydrocarbons, can be condensed by cooling to form liquid oils, which can be used as liquid fuel, for example in engines. Long chains are typically chains of at least five or six carbon atoms (C5-C6). The remaining hydrocarbons present in the pyrolysis products, namely those with shorter chains, form a non-condensable gas, which means that they remain gaseous when cooled to a regular temperature and under common process conditions. Typically, pyrolysis takes place in a reactor, a closed tank in which waste material is heated in the absence of oxygen, by heating the wall of the tank. Except for plastic, pyrolysis can be performed analogously for recycling of other types of waste material, e.g. organic waste, rubber, etc.

In order to have the highest possible yield of useful end products, the thermal degradation should be effected as completely as possible, i.e. resulting in the largest possible volatile fraction, and as little carbonized products or non-degraded waste material as possible. On the other hand, the quality of the pyrolysis products obtained is also of great importance. This quality refers to various aspects. On the one hand, it refers to the distribution of hydrocarbons present within the volatile fraction: preferably the distribution is such that a peak occurs at those chains that are most desired as end product, for example a large presence of chains that are condensable and can be used as fuel in engines (e.g. C5-C10). On the other hand, a high quality of pyrolysis products refers to a volatile fraction that is as pure as possible, i.e. the lowest possible presence of pollutants in the pyrolysis products. Pollutants can originate from the waste material. For example, Chlorines (Cl) present in PVC or bleached paper give rise to Chlorides in the pyrolysis products, or Bromines (Br) present in flame retardants give rise to Bromides in the pyrolysis products. The presence of such pollutants is detrimental to the quality of the resulting end product. For example, the corrosiveness of chlorides is problematic in the further processing of the oil or when it is used in an engine. On the other hand, pollutants can also originate from the pyrolysis process, for example when ash particles formed by carbonization are entrained in the volatile fraction and are present in the resulting oil after condensation.

Thus, there is a general need for pyrolysis solutions which result in a high yield and high quality of pyrolysis products formed.

Catalytic pyrolysis is known in the art, in which the pyrolysis is carried out in the presence of a catalyst, for example mixed in the waste material. The presence of a catalyst, for example zeolite or aluminum oxide, reduces the necessary reaction temperature and time, and results in a closer distribution of pyrolysis products. In JP11235561 broken shells are used as a cheaper catalyst.

However, the use of a catalyst alone is insufficient to ensure high yield and quality. For example, in JP11235561 the pyrolysis takes place in a dry distillation tank. Due to the stagnant waste material within this tank, it is difficult to achieve a homogeneous heat distribution throughout the material to be pyrolyzed, leading to overheating and carbonization near the wall of the tank, and insufficient degradation in more central zones. This results in a lower yield and a broadly distributed range of hydrocarbons.

Moreover, JP11235561 does not offer a solution to prevent pollutants in the pyrolysis products. A further process step is therefore necessary here for the removal of pollutants: HCl that is formed during the heating in the tank is treated with ammonia in JP11235561 in a further process step. Also, in JP2004323620, pollutants are present in the pyrolysis products, and a solution is proposed in which the volatile pyrolysis products are passed through a bed of shells or coral carcass to bind, for example, chlorides. Such a separate process step after the pyrolysis to remove pollutants requires a more complex installation and the purchase of specific products that can bind chlorides, for example. In JP S58 76128 particles of shell, soda lime or red mud are added in a fluidized bed reactor, as an adsorbent for HCl and S compounds. As the reactor does not have any moving parts, the risk of overheating and carbonization near the wall of the tank remains.

In US2010/0147670, the pyrolysis is carried out within a horizontal mixer with agitator, continuously mixing the waste material present during the pyrolysis. This results in a homogeneous heat distribution throughout the waste material. A homogeneous heat distribution is moreover promoted by the addition of foreign particles to the waste material. The particles, preferably with good thermal conductivity, for example steel granules, mix with the mass of waste material, thus avoiding the formation of agglomerations within the material to be pyrolyzed. The agitator also sets the reactor contents in motion near the reactor wall; molten waste material that sticks to the wall is loosened by the presence of the foreign particles and mixed back into the mass. The homogeneous heat distribution during the pyrolysis results in the thermal degradation of the waste material in a faster, more uniform and more complete manner.

In addition to the fact that the foreign particles in US2010/0147670 prefer to have good thermal conductivity, the size of the particles must be chosen very specifically. After all, this dimension must be attuned to a good distribution of the foreign particles in the waste material, and to the size of the gap present between the agitator and the reactor wall. The particles, for example steel grains, also end up with a great impact on the steel inner wall of the reactor and the agitator;

too large a particle size would possibly lead to increased wear of the reactor wall and agitator. The need for particles with such specific requirements creates additional complexity in producing or supplying them. Moreover, such specific particles also have to be recovered after use in the reactor. This aspect imposes additional requirements on the size of the particles, as they must be easily distinguishable from the ashes left in the reactor, and the screening and recovery again entail additional complexity. In other words, the use of foreign particles in US2010/0147670 provides a higher yield and homogeneous degradation but involves additional complexity. Finally, US2010/0147670 does not provide an answer on how to deal with pollutants such as chlorines and bromines.

It is an object of the present invention to describe a method that overcomes one or more of the described disadvantages of prior art solutions. More specifically, it is an object of the present invention to describe a pyrolysis process that allows to obtain end products of the desired composition in a simplified manner, with a high yield and minimal presence of pollutants.

SUMMARY OF THE INVENTION

According to the present invention, the above-identified objectives are achieved by a method for thermally decomposing a carbonaceous waste material comprising:
  filling a reactor defined by a reactor wall with said waste material and an auxiliary material, resulting in a reactor contents within the reactor wall, the auxiliary material comprising abrasive particles;
  heating the reactor contents in the absence of oxygen, whereby gaseous products are formed by pyrolysis of the waste material and the abrasive particles do not melt or thermally decompose;
  moving the reactor contents with respect to the reactor wall during the pyrolysis, the moving being adapted to mix the reactor contents and to cause the abrasive particles to scrape over at least parts of the reactor wall,
wherein the auxiliary material has a composition such that a component is comprised adapted to bind halogens present in the gaseous products and/or such that the brittleness of the auxiliary material is greater than the brittleness of the reactor wall.

In other words, the invention relates to a method for thermally decomposing a carbonaceous waste material. For example, a carbonaceous waste material refers to a mixture of plastic waste, which may contain various types of plastic, for example PE (Polyethylene), PP (Polypropylene), PVC (Polyvinyl Chloride), PET (Polyethylene terephthalate), PS (Polystyrene), etc. Other examples of a carbonaceous waste material are organic waste, food scraps, animal feed, rubber, wood, textiles, etc. The thermal decomposition of the waste material refers to the breaking of carbon and other bonds under the influence of heat, in other words to a thermal degradation of the waste material.

The method involves filling a reactor defined by a reactor wall with said waste material and an auxiliary material, resulting in a reactor contents within the reactor wall. A reactor refers to a closed container defined by a reactor wall. Filling the reactor results in the presence of waste material along with an auxiliary material within the reactor. Various embodiments are possible with regard to how filling is effected. For example, all auxiliary material may be first introduced into the reactor, and only afterwards the waste material. In other embodiments, the auxiliary material and waste material are premixed, or the waste material enters the reactor prior to the auxiliary material. The form under which the waste material is introduced into the reactor can also differ in possible embodiments. For example, the waste material can already be in a molten state at the time of filling the reactor, or the waste material can still comprise the original solid-state mix without pre-treatment having occurred.

The auxiliary material includes abrasive particles. Abrasive particles refer to solid particles that, through a mechanical movement, such as rubbing a surface, produce a scouring or scraping action. Abrasive particles can act as an abrasive, namely a material that allows to loosen something that sticks to a surface.

The method further comprises heating the reactor contents in the absence of oxygen, whereby gaseous products are formed by pyrolysis of the waste material and the abrasive particles do not melt or thermally decompose. Heating of the reactor contents is typically effected by heating the reactor wall, using a heat source outside the reactor. Various embodiments are possible for this heat source, such as electric heating or the combustion of a fuel. Heating is effected in the absence of oxygen to avoid oxidation or ignition of the reactor contents. For example, a closed reactor is provided in which a certain overpressure prevails. The heating is effected in such a way that temperatures are reached within the reactor at which pyrolysis of the waste material occurs. The pyrolysis results in the formation of a volatile fraction, comprising hydrocarbon chains of various lengths, which are all gaseous at the pyrolysis temperature. The abrasive particles have such a composition that they do not melt or thermally decompose during the pyrolysis of the waste material. In other words, they do not undergo any degradation or change of state under the influence of the prevailing temperature within the reactor. It is possible, however, that the abrasive particles undergo certain changes due to their presence within the reactor; for example, they can break due to their movements within the reactor and their interaction with reactor wall and agitator.

The method further comprises moving the reactor contents with respect to the reactor wall during pyrolysis. Moving the reactor contents involves a relative movement with respect to the reactor wall. In an embodiment, such a movement is generated by means of moving parts of the reactor. For example, the reactor wall may be stationary while the reactor contents are set in motion by means of an agitator or mixer within the reactor. In another embodiment, the reactor wall is moved, for example rotated, such that a relative movement is created between the reactor wall and the reactor contents.

The movement of the reactor contents relative to the reactor wall is adapted to mix the reactor contents and to cause the abrasive particles to scrape over at least parts of the reactor wall. This means that on the one hand the waste material and the auxiliary material present within the reactor are mixed with one another. On the other hand, there is a movement through which the reactor contents, in particular certain of the abrasive particles present, move along the reactor wall, thereby rubbing over the wall and scraping the wall. In other words, the movement of the reactor contents is such that abrasive particles being in contact with the wall, move over the wall, thereby rubbing over the wall and scraping it. This means that not necessarily all the abrasive particles move simultaneously along the wall, but the movement allows a part of the present particles to instantaneously move over the wall and thereby exert their scouring or scraping action. Various embodiments are possible to achieve such movement. For example, an agitator with blades or paddles is provided within the reactor, wherein centrally positioned blades may be provided to mix the internal mass, as well as blades that are positioned near the reactor wall to urge mass to move along the reactor wall. For example, the agitator runs at a rotational speed between 30 and 90 rpm. A high rotational speed, for example between 70 and 90 rpm, contributes to obtaining a homogeneous mixing of the reactor contents. In another embodiment, the movement of the particles across the wall is accomplished by rotating the reactor wall or moving it up and down, while mixing is accomplished by an agitator or screw centrally in the reactor. In each of the embodiments, the reactor contents are kept in motion at least in part during the pyrolysis; a stagnant reactor contents during the entire pyrolysis is thus avoided. During the melting of the waste material, prior to the actual pyrolysis, the waste material can be set in motion or can be in a stationary state.

Within the method of the invention, the auxiliary material has a composition such that a component is comprised adapted to bind halogens present in the gaseous products and/or such that the brittleness of the auxiliary material is greater than the brittleness of the reactor wall. This means that, in addition to the fact that the auxiliary material comprises abrasive particles, the composition of the auxiliary material is chosen such that a more advantageous process is obtained.

An auxiliary material in which a component is present adapted to bind halogens refers to an auxiliary material that, through its composition, will react with halogens present in the pyrolysis gases. Halogens are, for example, Chlorine (Cl), Bromine (Br), Fluorine (F), Iodine (I). Due to their presence in the mix of waste material, they occur as pollutants in the pyrolysis gases. For example, Chlorines (Cl) present in PVC or bleached paper give rise to Hydrogen Chloride (HCl) in the pyrolysis products, or Bromines (Br) present in flame retardants give rise to Bromides in the pyrolysis products. In one embodiment, the auxiliary material contains Calcium (Ca) as a component adapted for binding halogens, which, for example, is present in the auxiliary material in the form of Calcium Carbonate ($CaCO_3$). For example, the auxiliary material consists of (broken) shells, pieces of limestone, pieces of marble, etc. The component Ca present in the auxiliary material will bind halogens present in the pyrolysis gases, whereby for example Hydrogen Chloride (HCl) present in the pyrolysis gases reacts with $CaCO_3$ to form the salt Calcium Chloride ($CaCl_2$), or Hydrogen Bromide (HBr) present in the pyrolysis gases reacts with $CaCO_3$ to form the salt Calcium Bromide ($CaBr_2$). In other embodiments, the component adapted to bind halogens is an element other than Calcium, for example, a metal such as Aluminum, or Magnesium (Mg) present as Magnesium Carbonate ($MgCO_3$) in the auxiliary material.

In possible embodiments, the halogen binding component is included in the abrasive particles. For example, shells, broken shells or pieces of marble are on the one hand particles with abrasive properties and on the other hand particles comprising $CaCO_3$. Sand with fragments of shells or coral skeletons is another example. In other embodiments, the auxiliary material is a mixture of abrasive particles and a material with a halogen bonding component. For example, the auxiliary material is then a mixture of sand, which consists of abrasive particles, and Calcium Hydroxide (Ca(OH)2) in powder form, which comprises Ca as the halogen-binding component.

An auxiliary material having a composition such that the brittleness of the auxiliary material is greater than the brittleness of the reactor wall refers to the presence of particles within the auxiliary material that are easily broken. A brittle material refers to a material that will break without much stretching and where little energy is required to break this material. This energy is measured, for example, by means of a notched impact test, in which brittle materials have a lower impact value than ductile materials. A reactor wall is typically made of steel. An auxiliary material with a brittleness greater than a steel reactor wall is, for example, the material of seashells, coral carcass, limestone, porous rocks such as pumice, certain mineral rocks, etc. In other words, in an impact between a brittle particle of auxiliary material and a steel wall, the particle will break first, when this impact is sufficiently great.

Thus, within this embodiment, the composition of the auxiliary material is such that the particles present are brittle. Typically, this means that the composition of the auxiliary material is such that the abrasive particles break during moving the reactor contents relative to the reactor wall during the pyrolysis. In that case the reactor, for example the shape and material of the wall and of the agitator, and the movement, for example the rotational speed at which the reactor rotates, are such that the abrasive particles break during their stay in the reactor. For example, the fracture of a particle can result from an impact of the particle with the agitator or with the reactor wall, or from the interaction with the rest of the reactor contents. Typically, the rotational speed at which an agitator rotates, for example, is sufficiently high, for example 70 to 90 rpm, to provide energy at which at least some of the particles break. In one embodiment, it is also possible that all or some of the particles do not break, for example because they are very small pieces. The very small pieces may consist of a brittle material, but they will not break during their presence in the reactor.

Within the method of the invention, the auxiliary material has a composition such that (1) a component is included adapted to bind halogens, but the auxiliary material is not brittle; or such that (2) the brittleness of the auxiliary material is greater than the brittleness of the reactor wall, but no halogen-binding component is present; or such that (3) a halogen-binding component is present, and the auxiliary material is brittle. Examples of an auxiliary material that combines both aspects are: (sea) shells, broken (sea) shells, pieces of coral carcass, pieces of limestone, pieces of a calcium-containing mineral, etc.

Choosing the composition of the auxiliary material as described above is associated with several advantages. First of all, the auxiliary material comprises abrasive particles. As a result of the mixing movement, the abrasive particles distribute among the waste material in the reactor, and the formation of agglomerations within the material to be pyrolyzed is avoided. This contributes to a homogeneous heat distribution within the material to be pyrolyzed and consequently a higher yield of end products and a narrow distribution within the pyrolysis products obtained. In addition, the abrasive particles will scour or grind over the reactor wall due to the relative movement of the reactor contents with respect to the wall. The abrasive particles will loosen molten waste material that sticks to the wall, but also scrape along the wall to continuously scour the wall clean. This avoids carbonization of waste material on the reactor wall, whereby waste material carbonizes as a result of the very high temperature on the wall. Once carbonization starts, it is important to stop it quickly, as there is a catalytic effect where carbonization rapidly continues and expands once it has started. This is achieved by continuously scraping the wall clean. The avoidance of carbonization ensures a higher yield of pyrolysis products, avoids that ash particles are entrained in the volatile fraction as pollutants, and avoids the build-up of an insulating layer on the reactor wall. The latter contributes to a more efficient heat transfer from the heat source to the reactor contents and benefits a homogeneous heat distribution within the reactor.

Furthermore, an embodiment in which a halogen-binding component is present within the auxiliary material has the advantage that fewer pollutants are present in the pyrolysis gases and thus in the end products. Indeed, halogens such as Cl and Br present in the original waste material mix are bound by the component present in the auxiliary material. As a result, end products of a better quality are obtained and problems, for example due to the corrosiveness of HCl, are avoided. The binding of the halogens takes place here directly during the pyrolysis: pyrolysis gases that are formed during the heating in the reactor react immediately with the auxiliary material present. This means that no additional step after the end of the pyrolysis is required to rid the pyrolysis gases or resulting products of such pollutants. This contributes to a less complex installation and a simplified process. Moreover, the halogen-binding component can be integrated within the abrasive particles, which are already necessary to scrape the wall during the pyrolysis. This is the case, for example, when use is made of seashells or limestones as abrasive particles. Hereby a 2-in-1 function is obtained, in which the auxiliary material has both an abrasive and halogen-binding effect. The purchase of specific products merely focused on binding of the halogens in an extra step after the pyrolysis is thus avoided. Finally, the solid particles cause the halogen-binding component to be mixed with the material to be pyrolyzed. This contributes to an optimal contact between the halogen-binding component and the waste material, and consequently a better removal of pollutants from the pyrolysis gases.

Furthermore, an embodiment using a brittle auxiliary material has the advantage that particles break into pieces during their presence within the reactor, thereby decreasing their size. As a result, the abrasive particles need not be chosen very restrictively in terms of dimensions; a mixture of particles can be used in which not all particles have the same dimensions, or in which particles are still too large. By breaking the particles during the pyrolysis, particles are automatically obtained with dimensions that allow a good distribution among the waste material, or that are adapted to the size of the gap between an agitator and the reactor wall. For example, if a particle is initially too large to fit in that gap, it will break, after which the particle can still contribute to scraping the wall. The less strict requirements for the dimensions of the abrasive particles mean that they must not be selected very specifically or must not be specially produced as calibrated particles. For example, use can be made of an auxiliary material that in itself can be regarded as waste, such as a mix of (broken) seashells. This also means that the auxiliary material need not be recoverable, and therefore there are no restrictions on the particle size to allow screening thereof. It also avoids the complexity of a screening and recovery step, which contributes to simplifying the process.

In addition, breaking brittle particles results in particles with typically sharp edges. Unlike particles that are spherical and tend to roll, the sharp edges contribute to a better scouring or scraping action of the particles. This leads to less carbonization on the reactor wall, and thus a higher yield, less ash particles in the pyrolysis products, and the avoidance of an insulating layer on the reactor wall.

Finally, brittle particles that hit the reactor wall or an agitator at a high velocity will not cause damage to the reactor wall or an agitator. After all, these particles break into pieces and do not cause deformation or wear of the reactor wall or agitator. This contributes to a reduced reactor wear, less maintenance, and a longer reactor life.

In general, the invention thus contributes to a pyrolysis process that makes it possible to obtain end products of the desired composition in a simplified manner, with a high yield and minimal presence of pollutants. In particular, the composition of the auxiliary material can be selected in a targeted manner, for instance in function of the type of waste material to be pyrolysed. For example, if it concerns a plastic mix with the presence of PVC waste or traces of PVC, then an auxiliary material with a halogen-binding component should preferably be selected. In the case of organic waste without chlorines, the choice of the auxiliary material can, for example, be mainly focused on brittleness. In one embodiment, when the halogen-binding and brittle aspect of the auxiliary material are combined, the advantages associated with both aspects are also obtained.

Optionally, the auxiliary material has a composition adapted to bind Chlorine and/or Bromine present in the gaseous products. Chlorine and Bromine are halogens that typically occur in a mix of plastic waste material, for example from PVC or bleached paper, respectively, and flame retardants. In the gaseous pyrolysis products, they give rise to Hydrogen Chloride (HCl) and Hydrogen Bromide (HBr) respectively.

Optionally, the auxiliary material comprises Calcium. In other words, the auxiliary material is a calcium-containing material. In possible embodiments, Calcium can be present in various forms, such as $CaCO_3$ or $Ca(OH)_2$. For example, the auxiliary material consists of (sea) shells, broken (sea) shells, pieces of coral carcass, pieces of limestone, pieces of a calcium-containing mineral, pieces of marble, a mixture of sand and slaked lime, sand containing fragments of shells or coral skeletons, etc. The Calcium present in the auxiliary material will react with, for example, HCl or HBr present in the pyrolysis gases, forming a salt, Calcium Chloride ($CaCl_2$) and Calcium Bromide ($CaBr_2$), respectively. This contributes to the elimination of pollutants in a simplified process.

Optionally, the abrasive particles have a composition adapted to bind halogens. In this embodiment, the halogen binding component is integrated within the abrasive particles. For example, the auxiliary material consists of abrasive particles comprising Calcium, for example (sea) shells, broken (sea) shells, pieces of limestone, pieces of a calcium-containing mineral, pieces of marble, etc. Hereby a 2-in-1 function is obtained, whereby the auxiliary material has both an abrasive and a halogen-binding effect. Since the abrasive particles are already necessary to scrape the wall during the pyrolysis and to avoid carbonization, the purchase of an additional substance specifically aimed at binding halogens is avoided. This contributes to a cheaper and simplified process.

Optionally, the abrasive particles comprise calcium carbonate. For example, the abrasive particles are (sea) shells, broken (sea) shells, pieces of limestone, pieces of a calcium-containing mineral, pieces of marble, etc.

Optionally, in a possible embodiment, the auxiliary material is chosen such that it allows good heat conduction. For this reason, for example, a dense calcium carbonate as present in seashells is chosen, with a thermal conductivity of the order of 2.6 W/mK. A porous calcium carbonate, on the other hand, has a lower thermal conductivity, in the order of 0.4 W/mK.

Optionally, in one possible embodiment, the auxiliary material is selected such that the density of the auxiliary material is in the order of the density of the liquid polymer mass within the reactor during the pyrolysis. This allows good mixing of the auxiliary material with the rest of the reactor contents and prevents the abrasive particles from floating or sinking in the reactor contents.

Optionally, the abrasive particles have a composition adapted to bind the halogens and the brittleness of the abrasive particles is greater than the brittleness of the reactor wall, and the abrasive particles are taken from the group of: shells, seashells, broken shells, broken seashells, pieces of coral carcass, pieces of limestone, pieces of a calcium-containing mineral. Calcium-containing minerals are, for example, brittle and calcium-containing rocks such as Calcite or Dolomite. In these embodiments, the halogen binding property of the auxiliary material is combined with the brittle property of the auxiliary material. This contributes to the elimination of pollutants such as halogens and ash particles in a simplified process, a freer choice of auxiliary material that must not be specially produced for this process, the avoidance of carbonization on the reactor wall, and reduced wear on the reactor. Consequently, this results in a higher yield of the desired high quality end products.

Optionally, the auxiliary material is a mixture of abrasive particles and slaked lime. Slaked lime or Ca(OH)2 occurs in powder form, and therefore has no abrasive effect. For example, the slaked lime is mixed with sand as abrasive particles. Sand can be purely silicon oxide or can also contain calcium-containing particles, such as fragments of shells and/or coral skeletons. In this way a mixture is obtained that combines the abrasive function with the halogen-binding property of Calcium. The slaked lime powder can moreover be entrained by the abrasive particles in the waste material, whereby a better halogen-binding effect is obtained than if only slaked lime were used in the reactor.

Optionally, the brittleness of the auxiliary material is greater than the brittleness of the reactor wall, and the auxiliary material is taken from the group of: shell material, seashell material, a porous rock. In this embodiment, the auxiliary material is brittle and a halogen binding component may or may not be present. Examples of a porous rock are pumice or certain mineral rocks. The brittleness of the auxiliary material has the advantage that the size of the particles adapts by breaking during the pyrolysis, the auxiliary material does not have to be produced specifically for this application, no recovery of the auxiliary material is required, the sharp edges of broken particles are scraping well along the reactor wall, and less reactor wear occurs. All this contributes to the avoidance of carbonization on the wall and thus less ash particles and a higher yield, and a simplified process.

Optionally, the seashells or broken seashells have a size of a minimum of 0.2 mm and a maximum of 13 mm, preferably a minimum of 1 mm and a maximum of 10 mm, this dimension being the diameter of a circle surrounding a shell.

Optionally, the hardness of the abrasive particles is less than the hardness of the reactor wall. Abrasive particles that have a sufficiently low hardness contribute to the reduction of plastic deformations in the reactor wall and any agitator within the reactor. Plastic deformations refer, for example, to scratches or indentations in the reactor wall. This leads to a reduced wear of the reactor, a reduced need for maintenance and a longer lifetime.

Optionally, the reactor contents are continuously moved during the pyrolysis. This means that the movement of the reactor contents, whereby the reactor contents are mixed, and the abrasive particles scour the reactor wall, takes place continuously for the duration of the pyrolysis. On the one hand, this promotes a homogeneous heat distribution within the reactor contents during the pyrolysis, and thus a complete conversion to the desired end products. On the other hand, this ensures the continuous clean scraping of the reactor wall. Any carbonization that starts on the reactor wall is thereby immediately stopped. This prevents incipient carbonization on a small part of the reactor wall from rapidly expanding. This contributes to a higher yield and the avoidance of polluting ash particles in the pyrolysis gases.

Optionally, filling the reactor comprises feeding the auxiliary material into the reactor, followed by feeding the waste material into the reactor. This means that first the abrasive particles are introduced into the reactor, and then the waste material to be pyrolyzed. Afterwards, the auxiliary material and the waste material are then mixed within the reactor. This prevents waste material from landing directly on the hot reactor wall during reactor filling, causing it to immediately adhere to the reactor wall and cause carbonization to occur. Moreover, heat is already transferred from the reactor wall to the abrasive particles in this way after the auxiliary material has been introduced into the reactor, so that these particles are preheated. When these preheated particles are subsequently mixed with the waste material, this promotes homogeneous heat distribution within the waste material.

According to a second aspect of the present invention, the above-identified objectives are achieved by a system for thermally decomposing a carbonaceous waste material, comprising:

a buffer of the waste material and a buffer of an auxiliary material, the auxiliary material comprising abrasive particles;

a reactor defined by a reactor wall, and a heating system adapted to heat the reactor wall, the reactor and the heating system being adapted to heat the waste material contained within the reactor in the absence of oxygen so that gaseous products are formed by pyrolysis of the waste material;

a supply system adapted to fill the reactor with a reactor contents comprising the waste material and the auxiliary material;

a mixing system adapted to move the reactor contents with respect to the reactor wall, the moving being adapted to mix the reactor contents and to cause the abrasive particles to scrape over at least parts of the reactor wall;

wherein the auxiliary material is adapted not to melt or thermally decompose during the pyrolysis of the waste material, and the auxiliary material has a composition such that a component is comprised to bind halogens present in the gaseous products and/or such that the brittleness of the auxiliary material is greater than the brittleness of the reactor wall.

In other words, the invention relates to a system comprising a reactor, a mixing system, a feed system and a buffer of waste and auxiliary material. A buffer refers, for example, to a silo or other storage provision in which a certain stock of waste material or auxiliary material is present. A reactor, waste material and auxiliary material, and the properties of the auxiliary material, are defined as described in previous sections. A supply system refers to a provision that allows material to be supplied to the reactor, for example comprising a screw, conveyor belt, or simply the supply from a silo.

A separate provision can be present for supplying the waste material and for supplying the auxiliary material, or a single provision can provide for the joint or separate supply of waste material and auxiliary material. A mixing system is for example a mixer comprising an agitator located within the reactor. As described in the previous sections, the movement induced by the mixing system is such that the reactor contents are mixed, and that abrasive particles move over the reactor wall, thereby rubbing over the wall and scraping it. The advantages obtained with this system are analogous to the advantages obtained with the method according to the invention as described in the preceding paragraphs.

Optionally, the mixing system includes an agitator comprising a shaft and blades mounted on the shaft. By rotating the shaft via a drive, the blades, paddles or vanes rotate so that the reactor contents are mixed. The blades are also designed such that there is typically a certain gap or space between one end of the blade and the reactor wall. In this way, reactor contents are set in motion close to the reactor wall, whereby the abrasive particles scrape the wall.

Optionally, the heating system is an electrical heat source. The use of an electric heater has the advantage that a highly controlled heat supply to the reactor can be realized with it. In this way, the temperature evolution within the reactor can be accurately controlled to the desired values. This contributes to a complete conversion during the pyrolysis and the realization of a narrow distribution with desired end products.

Optionally, the reactor is a horizontal mixer adapted to be positioned in flat or inclined condition. A horizontal mixer refers to a container with a central axis running horizontally. For example, an agitator is present within this container, the shaft of which is mounted along the central axis of the container. In one embodiment, the reactor is arranged flat so that the central axis is parallel to the horizontal ground surface. In another embodiment, the reactor is set up slightly inclined, the central axis having a certain degree of inclination with respect to the horizontal ground surface. The advantage of a horizontal reactor is that it achieves a more homogeneous mixing and more homogeneous temperature distribution than in a vertically installed reactor.

DETAILED DESCRIPTION OF THE EMBODIMENTS

Figure 1:
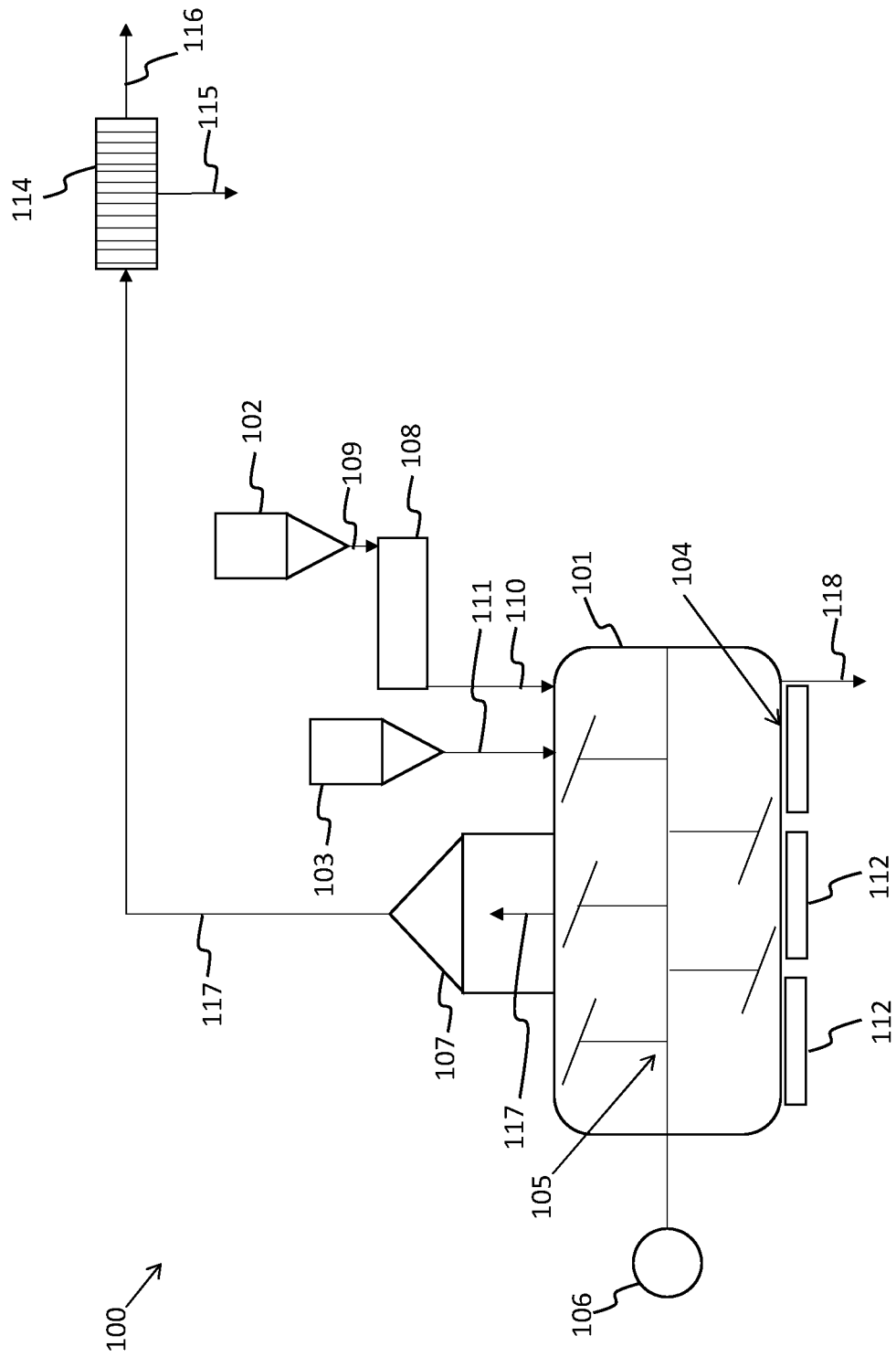
FIG. 1 schematically illustrates a system and method for pyrolyzing a waste material, according to an embodiment of the invention.

FIG. 1 illustrates the components included in a system 100 according to an embodiment of the invention, and the steps included in the corresponding method. The system 100 includes a reactor 101 with mixing system 105 and reactor wall 104, a heating system 112, a waste material buffer 102, an auxiliary material buffer 103, and a supply system for supplying waste material 110 and auxiliary material 111 to the reactor 101.

The waste material is, for example, a mixture of plastic waste, which may contain various types of plastic, for example PE (Polyethylene), PP (Polypropylene), PVC (Polyvinyl Chloride), PET (Polyethylene terephthalate), PS (Polystyrene), etc. Other examples of waste material are organic waste, food waste, slaughter waste, animal feed, rubber, wood, textile, etc. If necessary, a certain pre-treatment of the original mix of waste material can be effected. For example, plastic waste can be selected first, or it can be converted into pellets before entering the buffer 102. In the embodiment shown, the buffers 102 and 103 are silos, in which a supply of waste material, for instance plastic pellets, and auxiliary material, respectively, occur. Furthermore, there may be a provision 108 intended for further processing of the plastic pellets 109 before being fed into the reactor 101. The provision 108 includes, for example, a feed screw, an intermediate storage, a feed belt, and an extruder in which the plastic pellets are melted into a molten plastic mass 110. The auxiliary material 111, which is fed from silo 103 to the reactor 101, includes abrasive particles. The composition of the auxiliary material 111 is discussed further below. A supply line for a direct supply of auxiliary material 111 from the silo 103 can be provided, or provisions such as screw conveyors or conveyor belts can be used for this.

In the embodiment shown, the reactor 101 is a horizontal reactor, which can be arranged flat or with a certain slope with respect to the ground level. The reactor 101 includes a cylindrical tank, having a reactor wall 104. An electrical heater, consisting of multiple segments 112, is provided to heat the reactor wall 104. The heating elements 112 are shown in FIG. 1 presented purely schematically. The segments 112 can be independently controlled to provide constant and reliable heating of the reactor 101.

Figure 2:
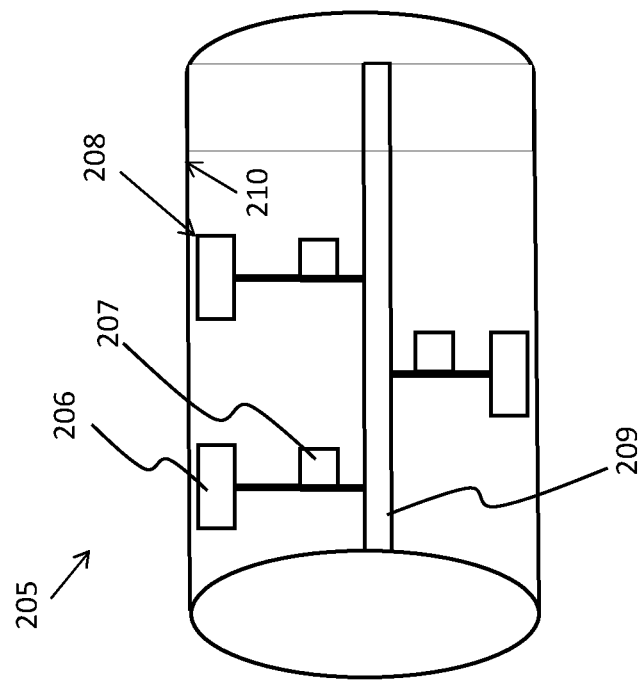
FIG. 2 shows two different mixing systems within a reactor, according to possible embodiments of the invention.
Figure 2:
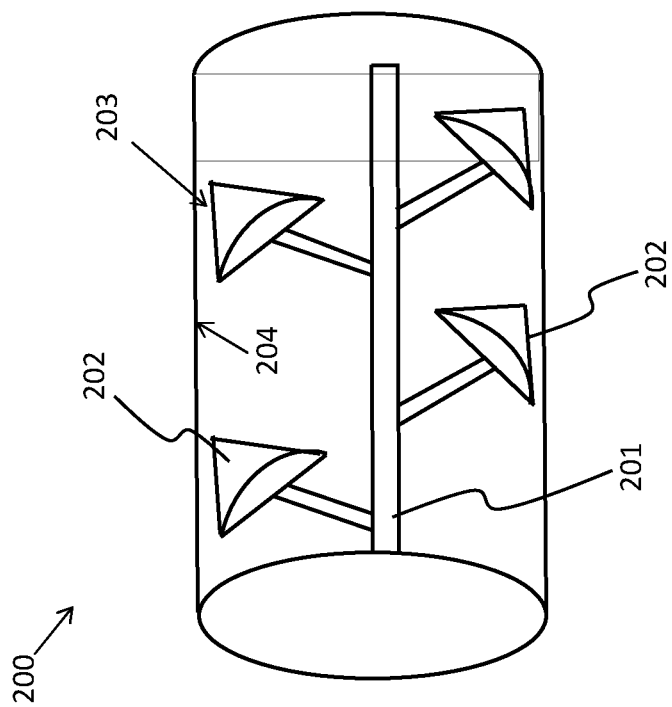

The cylindrical tank contains an agitator 105, which is driven by an electric motor 106. In the embodiment shown, the mixing system is a horizontal mixer, and the agitator 105 is implemented as a ploughshare or plowshare type of mixer, schematically shown in FIG. 1. FIG. 2 shows two possible embodiments of such a ploughshare mixer. The mixer 200 includes a shaft 201 on which blades 202 are mounted. Driving the shaft 201, through the motor 106, causes the blades 202 to move relative to the reactor wall 204, leaving a gap 203 between a blade 202 and the reactor wall 204. When contents are within the tank, the contents are mixed by this movement, and reactor contents are set in motion in the vicinity of the wall 204. In particular, abrasive particles contained in the reactor contents will scrape or scour along the wall 204. In other words, abrasive particles being in contact with the wall 204, move over the wall, thereby rubbing over the wall and scraping it. Similarly, the mixer 205, shown at right in FIG. 2, a shaft 209, and blades 206 moving in the vicinity of the wall 210, with a gap 208 between the blades 206 and the wall 210. The mixer 205 includes centrifugal blades 206 arranged close to the wall 210, and plates 207 arranged close at the shaft 209. The plates 207 promote mixing of the reactor contents.

At the top of the reactor 101, one or more supply ports are provided, adapted for dosing waste material 110 and auxiliary material 103, as shown schematically in FIG. 1. To monitor the process, a thermometer may be provided to measure the temperature of the reactor contents. A scale may also be present to measure the weight of the reactor 101 and thus monitor the amount of waste material to be pyrolyzed within the reactor.

At the top of the reactor 101, the gaseous pyrolysis products 117, which result from pyrolysis of the waste material within the reactor 101, are collected, see 107. At the bottom of the reactor 101 there is an outlet port, adapted to collect solid residues 118 of the pyrolysis process, for example ash, inert materials such as glass and sand, and auxiliary material, from the reactor 101.

Typically the reactor 101 is part of a petrochemical plant. Such plant includes the provisions to further treat and transform the pyrolysis products 117 derived from the reactor 101. Known technology can be used for this. In FIG. 1 schematically represents a cooling provision 114, adapted to convert via cooling the condensable hydrocarbons present in the pyrolysis products 117, for example in the range from C5 to C45, into liquid products 115. The non-condensable hydrocarbons in the pyrolysis products 117, in the range from C1 to C4, result in gaseous products 116. The refrigeration provision 114 may comprise several installations, such as different types of heat exchangers, a quench column, etc.

We now describe a method according to an embodiment of the invention, which can be performed with the system 100, for example. Within this embodiment a pyrolysis takes place of a plastic waste material, in which mainly PE and PP occur, with traces of PVC and chlorines from, for example, bleached paper.

A step within this method involves filling a reactor 101 with waste material 110 and auxiliary material 111, resulting in a reactor contents within the reactor wall 104. Waste material can be in the form of solid pellets at ambient temperature, or may be supplied to the reactor 101 in molten form at a temperature of 200 to 300° C. The auxiliary material 111 comprises abrasive particles, for example broken seashells. Other possible embodiments of the auxiliary material 111 are discussed further. In the embodiment described here, the broken seashells are first fed into the already heated reactor 101. The reactor wall 104 is heated by means of an electric heater 112 and is at a temperature of about 600 to 700° C. By feeding the seashells first, they can act as a bed in the reactor 101, so that waste material 110 fed into the reactor 101 does not come into contact with the hot reactor wall 104 and carbonization is avoided at that time. The seashells are also preheated in this way.

Furthermore, the method includes heating the reactor contents in the absence of oxygen so that pyrolysis of the waste material occurs. The interior of the reactor 14 can be maintained at atmospheric pressure, or at a certain overpressure to avoid the supply of ambient air to the interior of the reactor 101. In addition, within the method, the reactor contents are set in motion during the pyrolysis by the agitator 105 rotating at 80 rpm in this embodiment.

In the described embodiment, the pyrolysis is performed in a semi-continuous process. The shells are first introduced into the reactor 101, for example until the reactor 101 is about 10% filled with shells. The temperature of the wall is then approximately 600 to 700° C., and the temperature inside the reactor, for example, approximately 420° C. A temperature within the reactor between 400° C. and 500° C. is recommended to obtain a high fraction of condensable hydrocarbons within the pyrolysis products.

Waste material 110 is then supplied. Within the reactor 101, the waste material 110 is mixed with the shells present by rotating the agitator 105. The shells thereby distribute themselves between the waste material, and also scrape off waste material that remains stuck to the reactor wall 104. The temperature within the reactor 101 is kept constant at about 420° C. so that pyrolysis of the waste material occurs. Pyrolysis products 117 are thereby formed, which are gaseous at the prevailing temperature, and which are collected in the unit 107. In the meantime, waste material 110 is continuously supplied during the pyrolysis, while both the temperature and the weight of material present within the reactor 101 are monitored. When the feed rate of the waste material 110 is greater than the rate at which degradation occurs within the reactor 101, the level of waste material within the reactor 101 gradually increases.

When a certain fill level has been reached, for example 70% of the reactor has been filled, the feed of new waste material 110 into the reactor 101 is stopped. The temperature of the waste material present within the reactor 101 can increase further, for example up to about 500° C. During this post-operation phase, pyrolysis of the waste material within reactor 101 continues, forming gaseous pyrolysis products 117. This phase ends when no gaseous hydrocarbons 117 leave unit 107 anymore.

During the entire pyrolysis process, both during the phase in which waste material 110 is supplied and during the post-operation phase, the agitator 105 continues to rotate, for example at a speed of 80 rpm. The material to be pyrolyzed is continuously mixed and the shells are distributed among the material to be pyrolyzed, so that agglomerations are avoided. In addition, by moving the blades 202, 206 along the reactor wall 104, shells scour along the reactor wall 104, so that the reactor wall 104 is continuously scraped clean. Carbonization of waste material on the reactor wall 104 and the build-up of an insulating layer on the reactor wall 104 are thus avoided.

After completion of the post-operation phase, solid material 118 remaining within the reactor 101 is removed from the reactor 101 through an outlet port. This concerns the shells that functioned as auxiliary material, ashes that are created from the pyrolysis of waste material, and inert materials such as glass and sand that were between the waste material and do not degrade. A too large amount of inert material would crush the shells while moving in the reactor 101. Optionally, the solid materials 118 may not be removed from the reactor 101 after each post operation. For example, after a post-operation phase has ended, feeding waste material and pyrolyzing it may be immediately restarted, and only after completion of the next post-operation the reactor is freed of solid materials 118. After removing the shells from the reactor 101, they are replaced by new shells to feed into the reactor 101.

Within the described embodiment, the gaseous pyrolysis products 117 leaving the unit 107 at a temperature of about 400° C. are cooled to about 70° C. Various types of liquid oils can be formed, such as, for example, parafins, isoparafins, aromatics, fuel similar to diesel, etc. The condensate, at a temperature of about 70° C., is collected, for example, in a crude oil tank.

In the above-described embodiment, use is made of broken seashells or seashells as auxiliary material. For example, the broken seashells have a size of a minimum of 0.2 mm and a maximum of 13 mm, preferably a minimum of 1 mm and a maximum of 10 mm, this dimension being the diameter of a circle surrounding a shell. The use of broken seashells as an auxiliary material is advantageous because of the combination of a number of characteristics. First, the seashells function as abrasive particles, which scour along the reactor wall 104 during the pyrolysis, so that the wall 104 is continuously kept clean.

In addition, the seashells consist of a fragile material, in particular a porous material with a brittleness greater than the brittleness of a typical steel reactor wall. The breaking of the shells during their presence within the reactor 101 causes the size of the shells to adapt to the size of the present gap 203, 208, and the dimensions need not be chosen very restrictively. The shells themselves therefore form a waste material that does not need to be recovered after use in the reactor. In addition, the shells cause no or minimal damage to the reactor wall 104 or agitator 105 when hit against them. The sharp edges of broken shells also contribute to a better scouring or scraping effect.

Finally, the seashells contain Calcium Carbonate (CaCO3), whereby the Calcium will react with halogens present in the gaseous pyrolysis products 117. In the described embodiment, the pyrolysis gases 117 contain HCl and HBr, and the reactions that occur are:

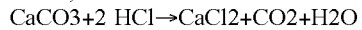
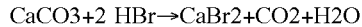

The salts CaCl2 and CaBr2 formed are discharged along with the other solid residual materials 118 through an outlet port of the reactor 101.

The CaCO3 present in the seashells thus ensures a direct binding of halogens in the pyrolysis products 117: the moment HCl or HBr are released, they are immediately bound, at the place where they are formed. This ensures an efficient removal of pollutants from the pyrolysis products in a simple way.

In one embodiment, the removal of chlorins using CaCO3 in the reactor can be supplemented by other measures, such as the use of halogen binding additives in the extruder 108. This makes it possible to have a very low Cl content in the resulting oil, for example at most 50 mg/kg by pyrolysis of a plastic mixture (PE, PP) with 0.1% to 1% PVC.

Besides the use of broken seashells as auxiliary material, other embodiments are also possible. For example:
- The component adapted for binding halogens can be an element other than Calcium, for example a metal such as Aluminum, or Magnesium (Mg) present as Magnesium Carbonate (MgCO3) in the auxiliary material.
- The auxiliary material can be a brittle material, without the presence of a halogen-binding component, for example a porous rock such as pumice stone or a mineral rock.
- The auxiliary material can comprise a halogen-binding component, without being a brittle material. For example, the auxiliary material can be a mixture of abrasive particles, e.g. sand, and a halogen-binding component, e.g. Ca(OH)2 in powder form. This mixture can be made in advance and thus being fed into the reactor.
- The auxiliary material can be a brittle material and comprise a halogen-binding component, for example pieces of coral carcass, pieces of limestone, pieces of a calcium-containing mineral, or the aforementioned (broken) seashells.

While the present invention has been illustrated by specific embodiments, it will be apparent to those skilled in the art that the invention is not limited to the details of the foregoing illustrative embodiments, and that the present invention can be practiced with various modifications and modifications. modifications without departing from the scope of the invention. The present embodiments are therefore to be considered in all respects as illustrative and not restrictive, the scope of the invention being described by the appended claims and not by the foregoing description, and any modifications falling within the meaning and scope of the claims, are therefore included here. In other words, it is understood to include all modifications, variations or equivalents that fall within the scope of the underlying basic principles and whose essential attributes are claimed in this patent application. In addition, the reader of this patent application will understand that the words "comprising" or "comprising" do not exclude other elements or steps, that the word "a" does not exclude a plural. Any references in the claims should not be construed as limiting the claims in question. The terms "first", "second", "third", "a", "b", "c" and the like, when used in the description or in the claims, are used to distinguish between like elements or steps. and do not necessarily describe a consecutive or chronological order. Likewise, the terms "top", "bottom", "over", "bottom" and the like are used for purposes of description and do not necessarily refer to relative positions. It is to be understood that those terms are interchangeable under appropriate circumstances and that embodiments of the invention are able to function in accordance with the present invention in sequences or orientations other than those described or illustrated above.

The invention claimed is:

1. A method for thermally decomposing a carbonaceous waste material, comprising:
   filling a reactor defined by a reactor wall with reactor contents comprising said waste material and an auxiliary material, said auxiliary material comprising abrasive particles;
   heating said reactor contents, whereby gaseous products are formed by pyrolysis of said waste material and said particles do not melt or thermally decompose; and
   moving said reactor contents with respect to said reactor wall during said pyrolysis, said moving being adapted to mix said reactor contents,
   wherein said auxiliary material further comprises a component adapted to bind halogens present in said gaseous products, said component being integrated with said abrasive particles;
   wherein a brittleness of said abrasive particles is greater than a brittleness of said reactor wall, causing at least a portion of said abrasive particles to break during said moving of said reactor contents;
   wherein said heating said reactor contents occurs in the absence of oxygen; and
   wherein said moving said reactor contents occurs by means of a mixing system, said mixing system comprising an agitator comprising a shaft and blades mounted on said shaft, wherein a gap is left between an end of respective blades and said reactor wall, thereby causing said reactor contents to move along said reactor wall, such that abrasive particles being in contact with said reactor wall move over said reactor wall, thereby scraping over at least parts of said reactor wall and loosening waste material that sticks to said reactor wall.

2. The method according to claim 1, wherein said halogens comprise chlorine and/or bromine.

3. The method according to claim 1, wherein said auxiliary material comprises calcium.

4. The method according to claim 3, wherein said abrasive particles comprise calcium carbonate.

5. The method according to claim 1, wherein said abrasive particles comprise one or more of shells, seashells, broken shells, broken seashells, pieces of coral carcass, pieces of limestone, and pieces of a calcium-containing mineral.

6. The method according to claim 1, wherein said auxiliary material is a mixture of said abrasive particles and slaked lime.

7. The method according to claim 1, wherein said auxiliary material comprises one or more of shell material, seashell material, and a porous rock.

8. The method according to claim 1, wherein a hardness of said abrasive particles is less than a hardness of said reactor wall.

9. The method according to claim 1, wherein said reactor contents are continuously moved during said pyrolysis.

10. The method according to claim 1, wherein said filling said reactor comprises: feeding said auxiliary material into said reactor, followed by feeding said waste material into said reactor.

11. The method according to claim 1, further comprising providing a buffer of said waste material and a buffer of auxiliary material, from which said waste material and auxiliary material are supplied to the reactor.

12. The method according to claim 11, further comprising heating said reactor wall via a heating system, wherein said heating system is an electrical heat source.

13. The method according to claim 11, wherein said reactor is a horizontal mixer adapted to be positioned in flat or inclined condition.

\* \* \* \* \*